(12) United States Patent
Otto

(10) Patent No.: US 6,600,774 B1
(45) Date of Patent: Jul. 29, 2003

(54) SYSTEM AND METHOD FOR COMMUNICATING WITH PLURAL REMOTE TRANSMITTERS

(75) Inventor: James C. Otto, Indian Harbor Beach, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/349,958

(22) Filed: Jul. 9, 1999

Related U.S. Application Data

(62) Division of application No. 08/708,031, filed on Aug. 30, 1996, now Pat. No. 5,982,808.

(51) Int. Cl.[7] ............................................. H04B 1/69
(52) U.S. Cl. ....................................... 375/139; 375/147
(58) Field of Search ................................. 375/130, 141, 375/147, 140, 139, 295; 342/357.06–357.09, 450, 463; 701/215, 216

(56) References Cited

U.S. PATENT DOCUMENTS

| | | | |
|---|---|---|---|
| 4,359,733 A | 11/1982 | O'Neill | |
| 4,879,713 A | * 11/1989 | Ichiyoshi | 370/316 |
| 5,128,684 A | 7/1992 | Brown | |
| 5,287,384 A | 2/1994 | Avery et al. | |
| 5,365,516 A | 11/1994 | Jandrell | |
| 5,381,444 A | 1/1995 | Tajima | |
| 5,386,435 A | 1/1995 | Cooper et al. | |
| 5,701,328 A | 12/1997 | Schuchman et al. | |
| 5,751,703 A | 5/1998 | Kobayashi et al. | |
| 6,259,991 B1 | * 7/2001 | Nysen | 340/10.1 |

FOREIGN PATENT DOCUMENTS

| | | | |
|---|---|---|---|
| GB | 2 208 932 A | * | 4/1989 |
| WO | WO 91/16639 | * | 10/1991 |

* cited by examiner

Primary Examiner—Tesfaldet Bocure
(74) Attorney, Agent, or Firm—Duane Morris LLP

(57) ABSTRACT

A system for communicating with plural remote transmitters in which the transmitters send messages without a common synchronization source or polling by a controlling receiver. In one embodiment, the system uses the time position of frequency chirp signals to encode the identity and/or other information sent from the receiver. The system may use relatively low cost transmitters because the transmitters do not need to have a message or clocking signal receiving capability and the internal clocking signal source within the transmitter may be a relatively inexpensive device or circuit.

11 Claims, 7 Drawing Sheets

SYSTEM AND METHOD FOR COMMUNICATING WITH PLURAL REMOTE TRANSMITTERS

This application claims priority to and its divisional application of U.S. patent application Ser. No. 08/708,031, filed Aug. 30, 1996, entitled "System and Method for Communicating with Plural Remote Transmitters", now U.S. Pat. No. 5,982,808. The application is also related to two other applications filed by the present inventor, all assigned to the same assignee. These two applications are: "A System and Method for Geolocating Plural Remote Transmitters", Ser. No. 08/705,831, filed Aug. 30, 1996, now U.S. Pat. No. 5,859,613; and, "A System and Method for Communicating and/or Geolocating Plural Remote Transmitters Using A Time Invariant Matched Filter", Ser. No. 08/708,030, filed Aug, 30, 1996 now abandoned. Each of the other applications is incorporated herein by reference.

BACKGROUND OF THE INVENTION

The present invention is related, generally, to systems and methods for communicating information and for locating the geolocation of a remote transmitter. In particular, the present invention is related to a system for communicating from plural remote transmitters simultaneously without synchronization or polling and for determining the geolocation of specific ones of the plural transmitters.

It is well known to deploy communications systems in which a single, relatively central base unit communicates with plural, often mobile, units within its transmission range. Central dispatch systems, such as those employed by taxicabs, public services emergency personnel, and the like communicate voice and, more recently, digital data between the remote units and the central base unit. Still other present systems communicate digital data only from the remote units to the central base unit, such as "data radios" which often transmit remote sensor data from a wide geographic area to a central location. One known problem with such present systems is a need to coordinate the transmissions from the various remote units so as to avoid collisions with one another. A myriad of techniques have been used to provide such coordination or to resolve collisions. For example, in some systems, the various remote transmitters are polled by the central station in a logical or random sequence. Only the remote unit receiving the poll is then permitted to transmit during a succeeding predefined time period. In other systems, each of the remote units receives a common clocking signal and transmits to the central station at a time derived from the common clocking signal. Both these prior art schemes avoid collisions to some extent but at a cost of requiring each remote unit to be capable of both receiving and transmitting signals. Additionally, the time taken to send out polling and/or clocking signals reduces the amount of time available for the remote units to transmit.

Other prior art systems avoid collisions by assigning separate transmit frequencies for each remote unit, at an obvious cost of considerable amounts of bandwidth being occupied for systems having many remote transmitters. Still other systems permit collisions to occur and rely upon the remote transmitters to monitor the communicating frequencies to determine whether a collision has occurred and to reinitiate transmission of the message upon the detection of a collision. Again, such systems require the remote units to have the capability of both receiving and transmitting signals. In addition, such systems are sometimes known to have repeated collisions, delaying the receipt of the message contained therein, sometimes for relatively long periods of time. Finally, the number of remote transmitters is limited in such systems to a number which is dependent upon how often each of the remote units transmits and the length of each transmission.

It is also known in the prior art to geolocate a remote transmitting unit based on multiple receipts of a signal emanating from a remote transmitter. For example, plural receiving stations can receive a signal transmitted from a remote mobile unit and compare the times-of-arrival at the various receivers to determine a geolocation from which the signal was transmitted. Similarly, plural receiving stations can determine the angle-of-arrival of the signal from the remote mobile unit and by combining the different angle-of-arrival determinations at the plural-stations can calculate the likely geolocation of the transmitting mobile unit. Generally, the complexity of such locating systems increases substantially with the number of remote units which must be tracked.

As in the situation for voice or data communications, if plural remote units must be tracked simultaneously, the possibility of collisions of their signals increases. As the signals, collide, it is often difficult (if not impossible) for the receiver to distinguish the location of the units sending the locating signals which have collided. To avoid collisions, some prior art locating systems have used polling, common clocking signals, individual frequencies, etc. so that the detecting receiver can unambiguously detect a locating signal. Still other systems have resorted to sending the locating signals multiple times to enhance the possibility that the central receiver has received at least one of the locating signals. This latter technique obviously relatively expensive in terms of bandwidth.

It is also been proposed for locating systems to use direct spread spectrum modulation techniques at the remote, mobile units to avoid the problems of collisions and limited bandwidth availability. In such systems, each of the remote transmitters may use a Pseudorandom Number ("PN") modulation to spread the locating signal across a wide bandwidth. Such systems are expected to meet with some success in the transmission of the locating signals by plural remote units; however, the use of such systems usually involves the design and operation of a highly complex bank of correlators which can test incoming signals for the presence of all the permitted PN codes in a very short period of time. A large number of possible PN codes usually results in a very complex and expensive receiver to detect the various possible codes. If a system uses plural receivers, as is often done to provide a relatively wide geographic range of coverage for a system, the costs of such relatively expensive receivers is multiplied by the need for plural such receivers.

Accordingly, it is an object of the present invention to provide a novel system and method for communicating simultaneously radio frequency signals from plural, geographically diverse transmitters without a common clocking signal or a polling signal.

It is another object of the present invention to provide a novel system and method for communicating signals from plural transmitters without a substantial number of collisions.

It is yet another object of the present invention to provide a novel system and method for communicating simultaneously from plural transmitters into a receiver without a bank of correlators.

It is still another object of the present invention to provide a novel system and method for determining the location of one or more of plural simultaneously transmitting remote units without a common clocking signal or polling signal.

It is a further object of the present invention to provide a novel system and method for tracking the movement of plural remote-units at a relatively low cost per unit.

It is yet a further object of the present invention to provide a novel system and method for communicating simultaneously from plural remote transmitters without synchronization of the units to each other of to the receiver(s).

It is still a further object of the present invention to provide a novel signal processing architecture which simultaneously tracks the location of plural transmitting units using a time invariant matched filter.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
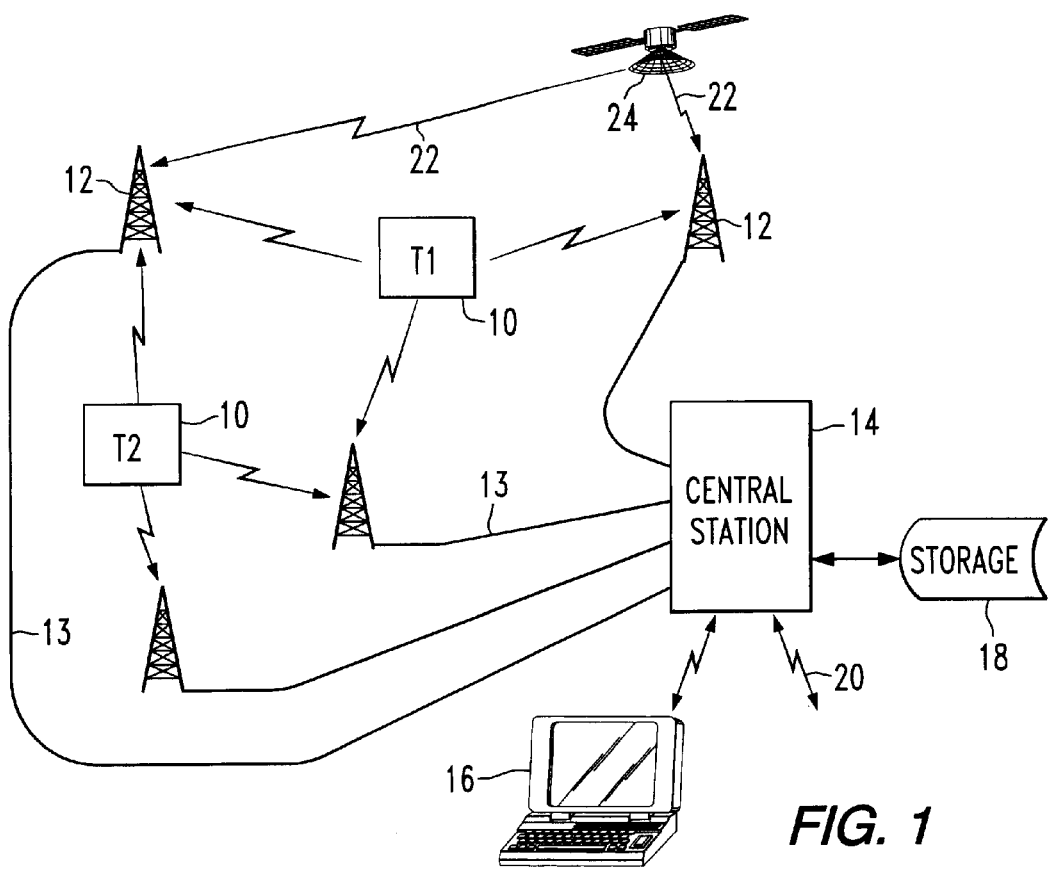
FIG. 1 is a simplified pictorial representation of a communication system in which the present invention may be used.

With reference to FIG. 1, a system in accordance with the present invention may include plural transmitters 10, which may be stationary or mobile, which are in communication with one or more receiving stations or base stations 12. The receiving stations 12 may communicate with a central station 14. This communication may be by way of conventional telephone circuits 13. The central station 14 may include a control console 16, a storage unit 18, and means for communicating 20 with other central stations 14 or external systems. A common clock signal 22 may be provided by a geostationary satellite system to each of the base stations 12.

In operation, the transmitters 10 may periodically or aperiodically transmit a beacon or signal to the base station (s) 12 within the range of its transmitted signal. The means for transmitting such a beacon or signal are described in detail below. The receiving station(s) 12 may receive the beacon signal from the transmitters 10 and may associate with such signals a time of arrival. Information regarding the signal which was received and the time of its arrival may be communicated by the receiving station(s) 12 through conventional means to a central station 14 for use in a variety of ways, as described below. In one embodiment of the present invention, the receiving station(s) 12 may be coordinated in time through the receipt of a clocking signal 22 from a common source, such as the satellite system 24.

The signals transmitted by the transmitters 10 may include an identification of the specific transmitter 10 which sent the signal, an indication that one or more events have occurred at the transmitter 10, a data portion relating to an activity or condition at the transmitter 10 (such as, without limitation, a temperature, a flow rate, a pressure reading, etc.), an indication that emergency assistance is required at the transmitter 10, and practically any other condition, indication, information, or circumstance which may be digitally encoded.

When the signals transmitted by the transmitters 10 are received at the receiving stations 12, information regarding the signals and their times of arrival may be communicated to the central station 14 for further analysis. Depending upon the type(s) of signals being communicated, the central station 14 may store related information on the storage unit 18, may transmit information regarding the signals to other central stations 14 or to other systems (not shown). For example, if the signals represent events which have occurred at a transmitter 10, information regarding the occurrence (and time) of the event may be sent to another system for operations or control purposes. Such a system could include a detector which detects an improper entry into a building and triggers an event signal at a transmitter 10. When the entry event is received by the central station 14, the central station 14 may notify a local police department of the event and the location of the transmitter 10 for appropriate police response. For another example, the signals could include data from a medical sensor attached to a user of the transmitter 10. When passed to the central station 14, the signals could be used to determine the present health of the user or to record (using the storage unit 18) the physical characteristics of the user over time. If the user's health were determined to need assistance, the signals from the receiving stations 12 could be analyzed, as discussed below, to determine the geolocation of the user so that medical personnel could be directly dispatched. Finally, the signals could merely identify the transmitter 10 and its location. Such a system could be used, for example, to monitor the instantaneous or history of the location of each truck in a fleet of delivery trucks.

Figure 2:
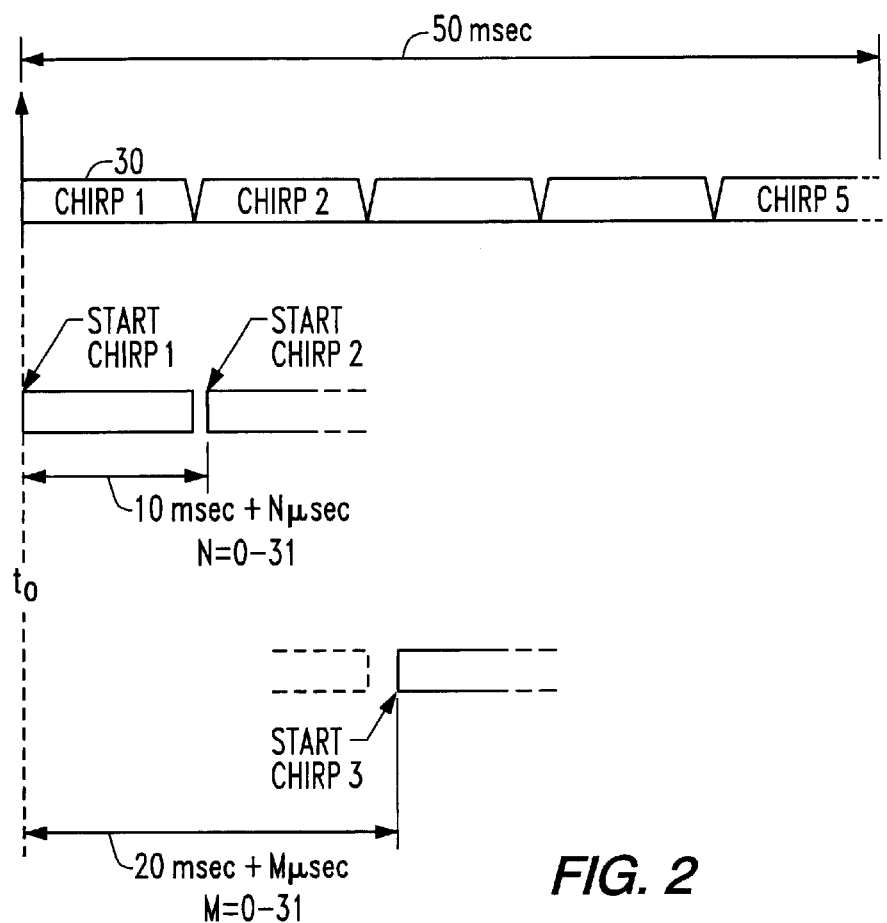
FIG. 2 is a timing diagram illustrating an encoding technique which may be used in a system of the present invention.

In one embodiment of the present invention, the signals from the transmitters 10 may have been encoded with digital information (signifying the identification of the transmitter, events, data, etc.). One means of encoding such data may be as illustrated at FIG. 2 in which chirp signals are generated at a predetermined rate and the second and subsequent chirp signals (or "chirps") are initiated at an offset from the time at which the predetermined rate would indicate. As shown in FIG. 2, a first chirp signal may start at any arbitrary start time, $t_0$. A second chirp would be expected to start at a predetermined time after the start time, depending upon the predetermined rate. To encode information, the delay of the second and subsequent chirps in a group of chirps can be delayed by detectable amounts and the amount of the delay can be made a function of the data to be transmitted. For example, with respect to FIG. 2, a chirp can be generated at a rate of 100 chirps per second. If the second and subsequent chirps are initiated at a delay of X microseconds, where X is a number between 0 and 31, each subsequent chirp can represent 5 digital bits of information ($2^5$ equals 32). If five chirps are sent as a group, all timed from the initiation of the first chirp, the entire group of chirps can encode twenty digital bits of information (4 subsequent chirps, each capable of encoding 5 bits of information). The types of information which may be encoded is broad and may include an identification of the transmitter, a sensor reading, a event identification, etc.

With continued reference to FIG. 2, the timing of the initiation of the second chirp equals 10 milliseconds (the duration of the first chirp) plus N microseconds, where N is a number between 0 and 31 and represents 5 bits of data to be transmitted. Likewise, the start of Chirp 3 will occur at 20 milliseconds plus M microseconds, where M is a number between 0 and 31 and represents another 5 bits of data to be transmitted. Upon the completion of the transmittal of five chirps, the sequence of transmission can be restarted at any arbitrary time thereafter.

Figure 3:
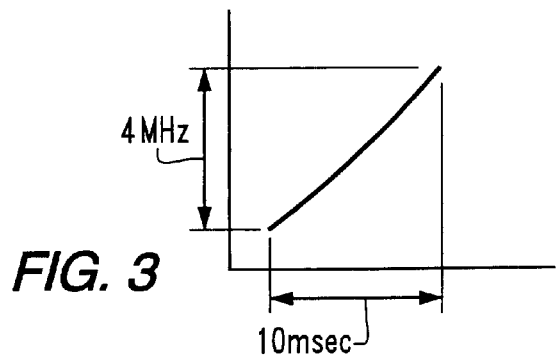
FIG. 3 is a graph illustrating a chirp signal which may be used in a system of the present invention.

With reference to FIG. 3, a chirp signal as used herein is a signal having a continuously varying frequency over a finite period of time. As depicted in FIG. 3, a chirp signal used in the present invention may be a signal having 4 MHz bandwidth which is swept over a 10 millisecond period. While the sweep of the chirp is shown in FIG. 3 as being upward over time, the present invention is not so limited and the chirp may sweep downward in frequency. It is also desirable that the sweep be linear, that is, the plot of the frequency of the signal over time is a straight line. The use of a linear sweep permits the receiver of the signal to use a time invariant matched filter to decode the transmitted signal, even with a signal that has a relatively large frequency offset. Thus, the transmitter may be built using a relatively inexpensive timing source, such as an inexpensive oscillator with poor frequency stability and the system will perform satisfactorily.

As will be recognized by those skilled in the art, the exact timing of the length of the chirps, the number of chirps in a group, the number of bits encoded by the delay in initiation of a chirp, or the amount of delay in the initiation of a chirp associated with a particular bit sequence are not limited to the times and numbers used in the exemplary embodiment and can be set to any practical values depending upon the sensitivity and accuracy of the transmitting and receiving equipment.

Figure 4:
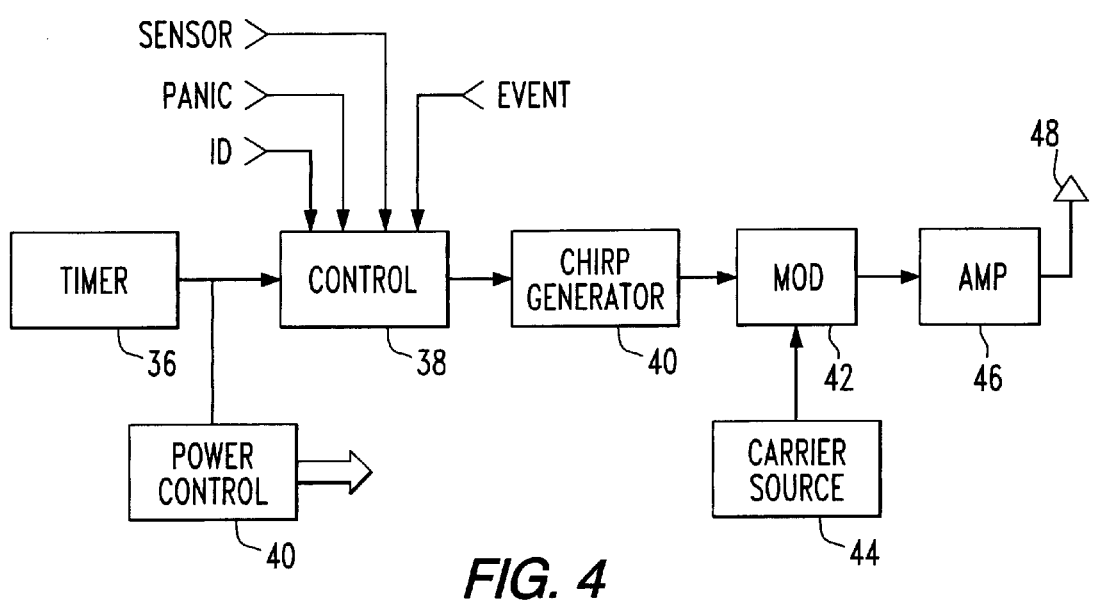
FIG. 4 is a simplified functional block diagram of a transmitter which may be used in a system of the present invention.

With reference now to FIG. 4, a transmitter in accordance with one aspect of the present invention may include a timer 36 which provides timing signals to a controller 38 and to a power control circuit 40. The controller 38 may also receive signals which provide information to the controller 38 such as the ID (identification) of the transmitter, a data reading from a SENSOR, a signal indicating the use of a PANIC button on the external casing of the transmitter 10, or a signal indicating the occurrence of an EVENT or one of several predefined EVENTs. Based on the timing signals and the information signals, the controller 38 may initiate a chirp generator 40 to generate a chirp signal at a desired instant of time. The chirp signal is provided to one of the inputs of a modulator 42 which modulates a carrier signal received from a carrier source 44 with the chirp signal to provide a modulated signal. The modulated signal is provided to a power amplifier 46 and ultimately to an antenna 48 for propagation to one of the receiving stations (not shown).

In operation, the timer 36 provides timing signals to the controller 38 and the power control circuit 40. The timing signals are generated to provide the timing within a group (or "frame") of chirp signals or between consecutive groups of chirp signals in accordance with the particular signalling protocol used by the transmitter. The timing signals are also used to energize and deenergize other portions of the circuitry of the transmitter when such portions are not needed. For example, the timing signals, operating through the power control circuit, may cause the chirp generator 40 and transmission circuits (modulator 40, power amplifier 46, carrier source 44, etc.) to be deenergized when no transmissions of signals are occurring.

With continued reference to FIG. 4, the controller 38 uses the timing signals to encode the various information desired to be transmitted using the encoding scheme of chirp signal position encoding discussed above in relation to FIG. 2. The information signals are received from a variety of sources, depending upon the specific information transmission needs of a particular system. An identification signal (ID) may be provided by switch settings, ROM programming, or a similar method of providing data which is not harmed by the removal of power from the transmitter. A PANIC signal may be initiated by the user of the transmitter through the operation of a panic button on the housing of a transmitter or through the entry of a particular key sequence on a keyboard associated with the transmitter. The SENSOR data may be received from any measuring, reporting, indicating unit which provides a data signal to be transmitted. The EVENT signals may be any type of data signal which indicates the passage of an event or group of events, including without limitation, buttons, switches, logic circuits, keys, etc. The signals from any of the sources may be in analog, digital or any other format recognized by the controller 38 and (if needed) convertible by the controller 38 to a digital signal.

At the appropriate time, depending upon the application, the controller 38 causes chirps to be generated by the chirp generator 40 to encode the data desired to be transmitted. The data may be as simple as the identification of the transmitter which is transmitted on a periodic basis or upon the occurrence of a particular event or sensor reading. In more complex systems, the data to be encoded and transmitted may include both an identification signal and the reading(s) from one or more sensors or event indicators. The framing of the encoded signals into one group of chirp signals or more than one group of chirp signals may be accomplished as needed for the length of the information to be sent. The generated chirps are used to modulate a carrier signal received from the carrier source 44 to provide a modulated signal which is amplified by the power amplifier 46 and transmitted through an antenna 48 in a conventional fashion. The modulated signal may be filtered, predistorted or otherwise manipulated as is conventionally known and well within the skill of the artisan for the amplification and transmission of modulated signals in general.

The carrier source may be any convention source of a carrier signal, such as, without limitation, a crystal oscillator, a digital signal synthesizer, an analog resonant circuit, or a signal provided by an external source. The chirp generator 40, modulator 42, carrier source 44, and related components may be either digital or analog devices.

Figure 5:
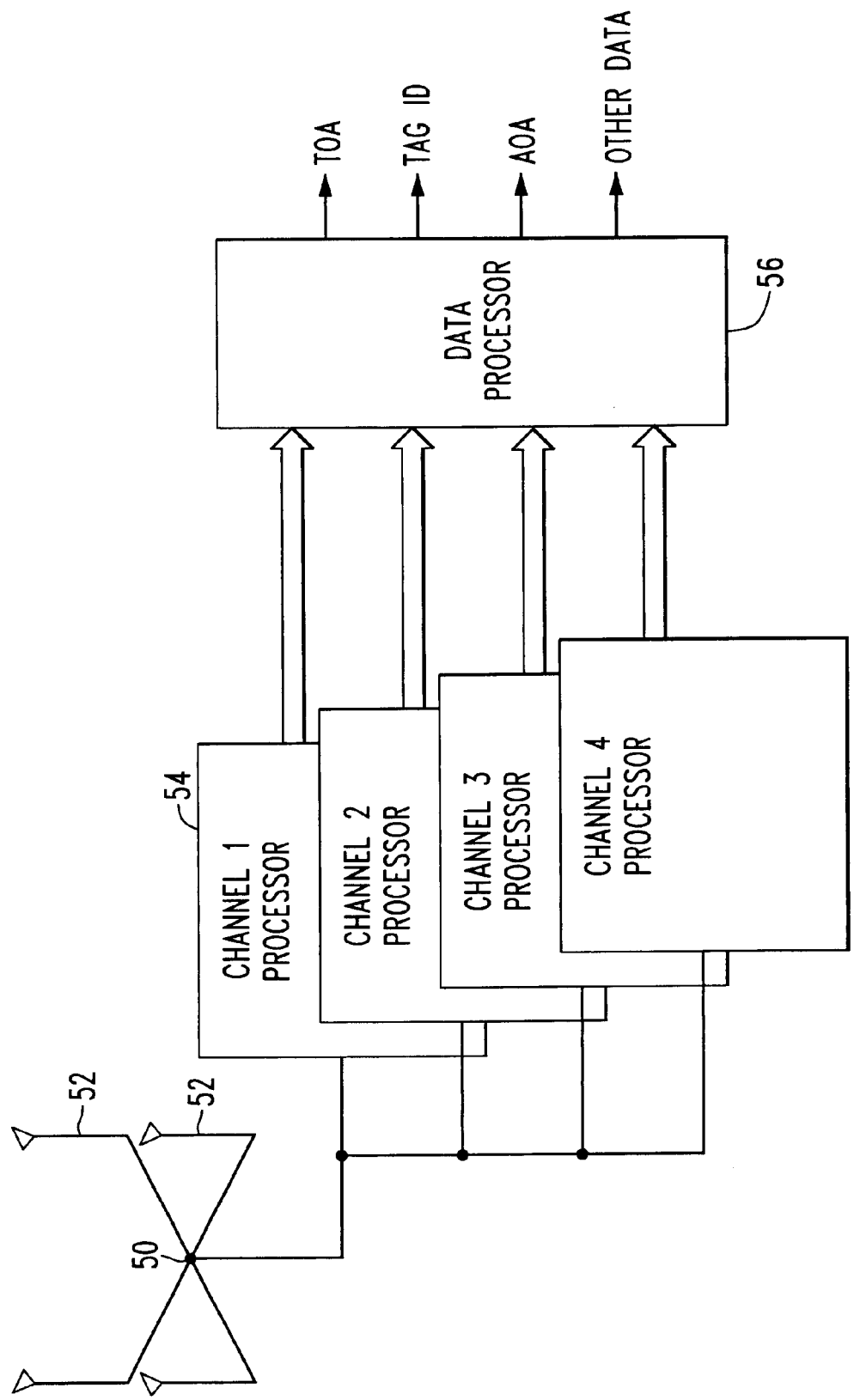
FIG. 5 is a simplified block diagram of a receiving station which may be used in a system of the present invention.

With reference to FIG. 5i one embodiment of a receiving station of the present invention may include an antenna 50 having four separate receiving elements 52. The signals from the individual receiving elements 52 are provided to a like number of channel processors 54 which demodulate the signals received on the elements 52, decode the information contained therein, and, in some instances, determine the time of arrival and/or angle of arrival of the decoded signals at the respective elements 52. Information regarding the received decoded signals and their times of arrival and/or angles of arrival may be provided to a data processor 56, which may provide an indication of the identity of the transmitter which has sent a signal, the data (if any) which was sent by the transmitter and, in some instances, the location of the transmitter as determined from the time and/or angle of arrival of the signals at the elements 54.

Figure 6:
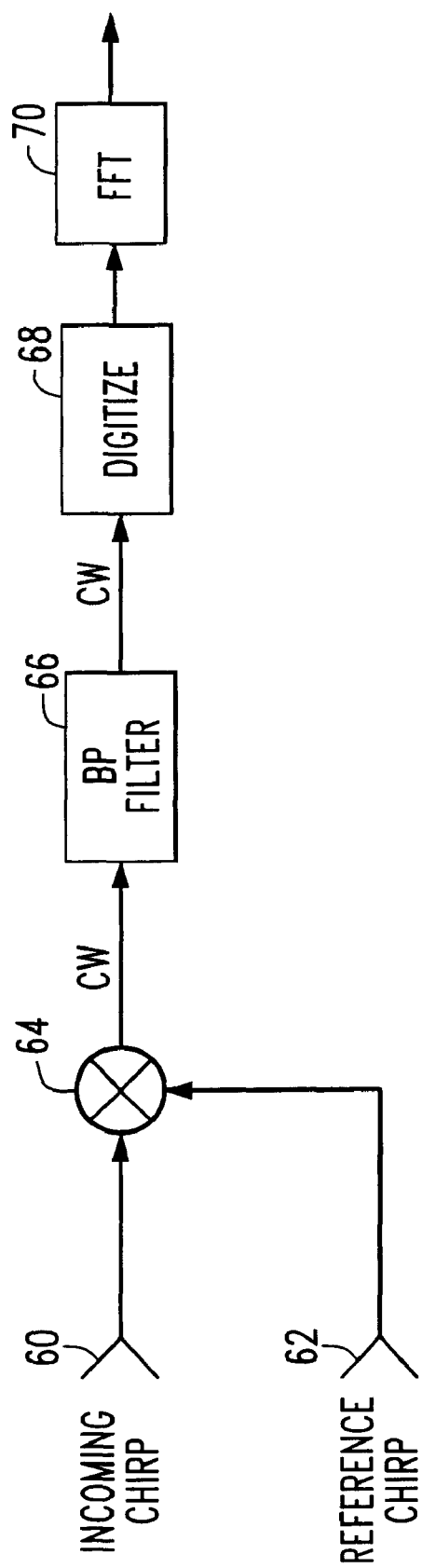
FIG. 6 is a simplified block diagram illustrating the operation of decoding scheme which may be used in the present invention.

One system by which the signals received at the receiving stations may be decoded is illustrated, broadly, in FIG. 6 in which an incoming chirp 60 (after appropriate downconversion, filtering and amplification) is modulated by a reference chirp signal 62 by a modulator 64 at the receiving station. In practice, the reference chirp signal 62 should have similar characteristics to the chirp signal which was generated at the transmitter. Preferably, the reference chirp should match the received chirp signal in slope, that is the plot of frequency versus time for the signals should have the same slope. As is known, the modulation of a chirp signal by another chirp signal generates a continuous wave signal ("CW") which has a frequency which is a direct function of the difference between the timing of the start of the two chirp signals. If the two chirps input to the modulator 64 have exactly the same timing, the output from the modulator 64 will be null. As the start timing between the two chirp signals increases, the frequency of the continuous wave signal generated by the modulator will increase.

If the chirps are relatively linear (as determined above), a frequency offset between the incoming chirp and the reference chirp will have relatively little effect on the performance of the system. If the chirp signals are relatively linear, a frequency offset has the same effect as a time offset between the incoming signal and the reference signal. As is explained below, the time differences between the signals from the remote transmitters and the receiving stations may be used to determine position by comparing the time differences at different receiving stations. Since these calculations are always relative to one another, the apparent time offset is removed at the system level by differential time of arrival processing. Thus, it is particularly advantageous in attempting to minimize the cost of the transmitter (by using relatively inexpensive timing circuits) to use a relatively linear chirp signal, which is a waveform known to have the above-described offset properties.

In the receiving stations of the present invention, the CW signal from the modulator 64 may be bandpass filtered to remove or discard signals in which the reference chirp and the incoming chirp are not sufficiently aligned in their initial timing. Signals passing through the bandpass filter 66 may be digitized by a analog to digital converter 68 and analyzed in a Fast-Fourier-transform ("FFT") circuit 70. The FFT determines the frequency of the signal received by it. Because the frequency of this signal is directly related to the timing between the (local) reference chirp and the received chirp, the frequency determined by the FFT will directly indicate the difference between the timing of the reference and incoming chirps, leading directly to both the time of arrival of the incoming chirp and the delays in the initiation of the second and successive chirps in an incoming chirp group (i.e., to the decoding of the data encoded by the time position of the chirps). As will be appreciated by those skilled in the art upon review of the simplified circuit of FIG. 6, by adjusting the timing relationship between the reference chirp and the incoming chirp, both the time of arrival of the incoming chirp and the data encoded thereon may be obtained.

Figure 7:
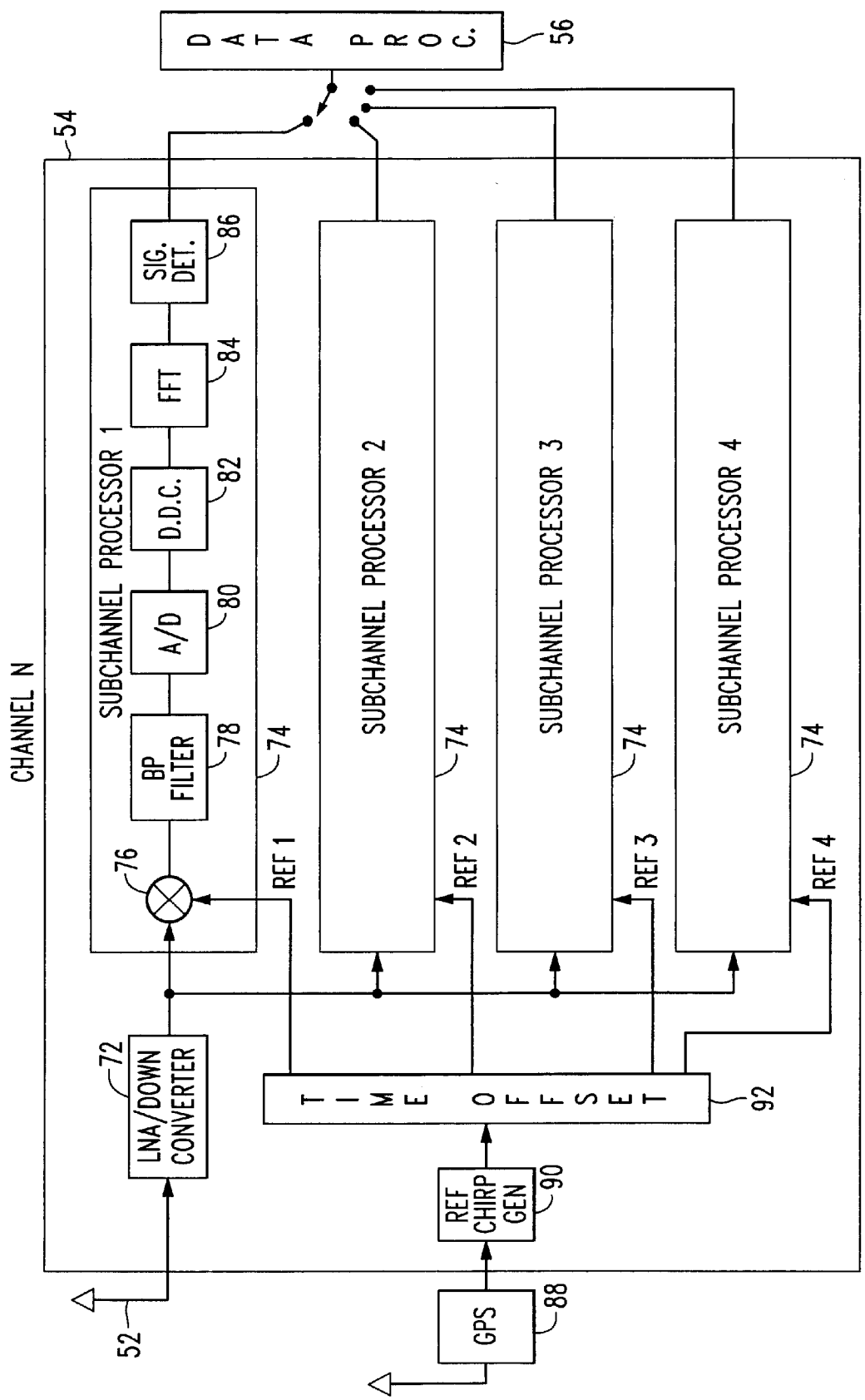
FIG. 7 is a simplified block diagram of the channel processor portion of the receiving station of FIG. 5.

With reference to FIG. 7, a channel processor 54 may decode the received signal and extract the information encoded thereon by receiving a signal from one of the elements 52 of the antenna. (not shown). In conventional fashion, the received signal may by low noise amplified and down converted to an intermediate frequency signal which is split and provided to plural subchannel processors 74. Within a subchannel processor 74, the intermediate frequency signal is modulated in a modulator 76 and provided to a bandpass filter 78. The filtered signal is applied to an analog to digital converter 80 which converts the signal to a digital form which is then down converted by a digital down converter 82. The downconverted signal is provided to an FFT 84, the output of which is analyzed by a signal detector 86. The detected signal (if any) from the signal detector 86 is provided to a data processor with, in some instances, a signal indicating the time of arrival of the detected signal.

With continued reference to FIG. 7, the channel processor 54 may also receive a clocking signal from a common source, such as a Global Positioning System ("GPS") satellite through a GPS decoder 88. The clocking signal is applied to a reference chirp generator 90 which generates a reference chirp similar in form to the chirp signal used by the transmitter (not shown) but asynchronous to the transmitter. The reference chirp signal is applied to a time offset circuit 92 which provides four copies of the reference chirp signal, each at a different delay from the other reference chirp signals. One copy of the reference chirp signal is supplied to the other input of the modulator 76 within each of the subchannel processors 74.

In operation, the time offset circuit may delay the various copies of the reference signal by increments equal to ¼ of the length of the chirp signal. For example, the copies of the reference chirp provided by the time offset circuit 92 are delayed by 0, ¼ the length of the chirp, ½ the length of the chirp and ¾ the length of the chirp. In the example system as used above, having a chirp length of 10 milliseconds, the time offset circuit 92 would produce reference chirp signals having 0 seconds, 2.5 milliseconds, 5.0 milliseconds, and 7.5 milliseconds offset, respectively, from the reference chirp. The four mutually-time-offset reference signals are then provided one to each of the subchannel processors 74.

With continued reference to FIG. 7, once a received signal has been amplified and down converted, the received signal is split into four identical signals which are provided to the modulators 76 of the subchannel processors 74. At each of the subchannel processors 74, the received signals are processed similarly; however, different results are obtained because of the timing differences in the reference chirp signals supplied to the subchannel processors 74. Within a subchannel processor 74, the received signal is modulated by the reference chirp supplied to it by the time offset circuit 92. As explained earlier, and assuming there to be a chirp signal within the received signal at an asynchronous timing with respect to the reference chirp, the modulation of the received chirp signal by the offset reference signal will generate a CW signal having a frequency directly dependent upon the difference in timing between the initiation of the received chirp signal and the offset reference chirp signal. The CW signal is filtered by a bandpass filter designed to pass signals having frequencies within a particular bandwidth of the intermediate frequency. Accordingly, the bandpass filter 78 removes those CW signals from received chirp signals (if any) which do not having an initial timing within a specific time relationship to the offset reference signal. If the bandwidth of the bandpass filter 78 is sized appropriately, the bandpass filter 78 of only one of the subchannel processors 74 will pass the CW signal of a particular received chirp signal, while the other bandpass filters 78 in the other subchannel processors 74 will filter out the CW signal generated by the modulation of the received chirp signal by offset reference signals not sufficiently matching the timing of the received chirp signal.

Figure 8:
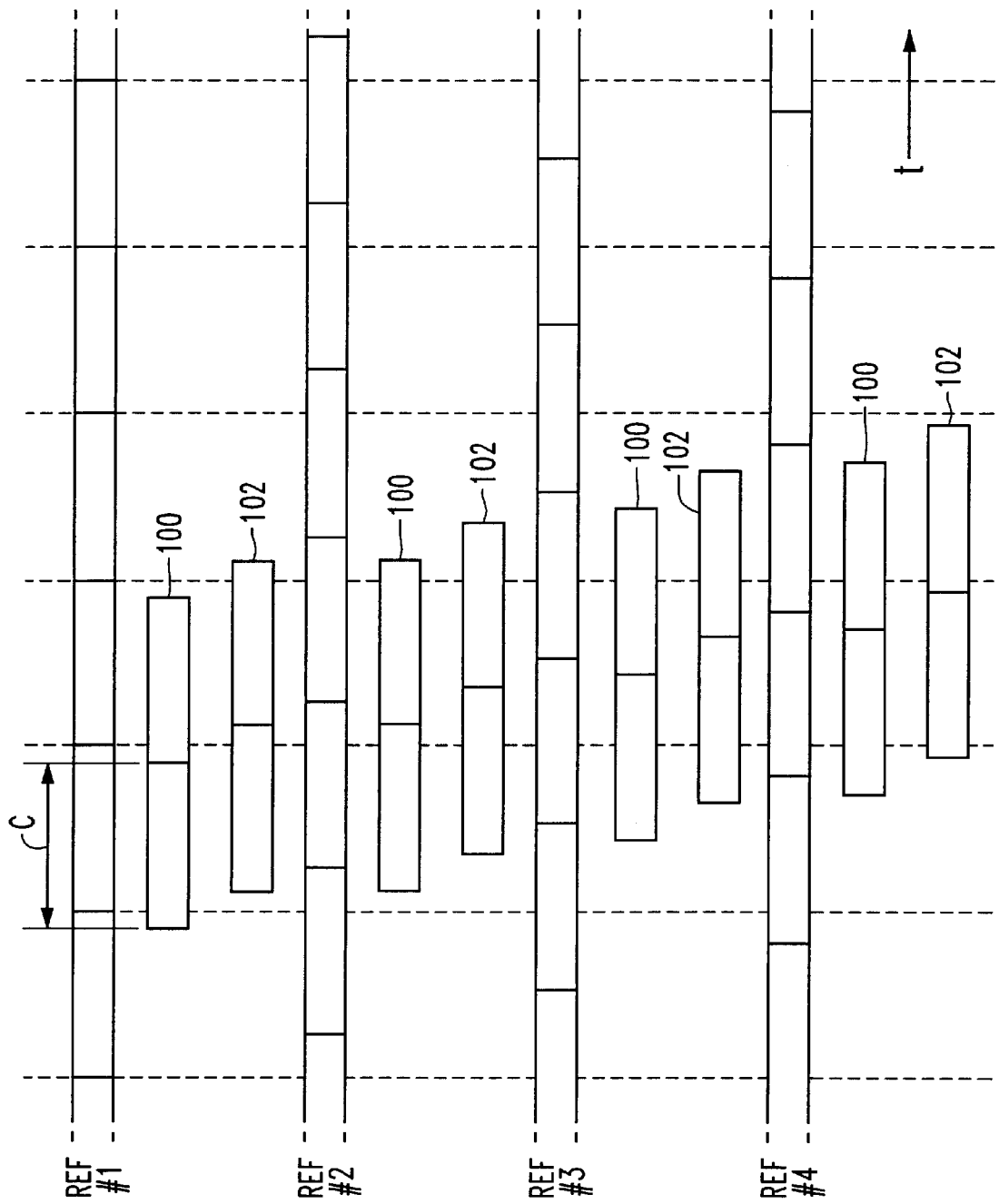
FIG. 8 is a timing diagram of the relationship among the subchannels of the channel processor of FIG. 7.

The isolation of the subchannel processor having the offset reference chirp signal best matching the timing of the received chirp signal is illustrated in the timing diagram of FIG. 8, along with FIG. 7. The timing diagram shows the generation of the four offset reference signals, REF 1, REF 2, REF 3, REF 4, with the vertical lines in the REF signals indicating the start of an offset reference chirp. If the bandwidth passed by the bandpass filter 78 is equivalent to a delay of +/−one-eighth of the length of the chirp, received chirp signals (only two shown) having the timing indicated by reference numeral 100 will be the earliest signals passed by the respective bandpass filters and received chirp signals having the timing indicated by reference numeral 102 will be the latest signals passed by the bandpass filters. Note that regardless of the timing of a received chirp signal, it will be passed by one of the bandpass filters and rejected by the other bandpass filters. Note also that the length of time "C" from the earliest received chirp at any one of the subchannel processors to the latest received chirp at any one of the subchannel processors matches the length of the chirp. As will be appreciated by those skilled in the art, practical problems in building bandpass filters with precise and sharp cutoff edges will result in some situations in which the bandpass filters of two of the subchannel processors 74 may permit their CW signals occurring near the extremes of the bandwidth to pass through; however, such practicalities do not substantially adversely affect the present invention as the subsequent processing of the signals can remove or resolve any ambiguities in signal timing caused thereby.

With reference again to FIG. 7, in the subchannel processor 74 having a CW. signal which passes through its bandpass filter 78, the CW signal is converted to its digital form by the analog to digital converter 80 and is digitally down converted to baseband by the digital down converter 82. The downconverted CW signal having a frequency related to the difference in timing of the offset reference chirp and the received chirp is provided to an FFT which determines the frequency of the CW signal. If the FFT determines that there is a CW signal present during any particular chirp period, the signal detect circuit 86 provides a signal to the data processor 56 indicating both the presence of the CW signal and the frequency thereof (which can be directly related to the timing of the received chirp signal with respect to the appropriate offset reference chirp signal).

With continued reference to FIG. 7, in the exemplary system discussed above, having a chirp length of 10 milliseconds, it has been found advantageous, although not required, that the intermediate frequency of the signal input to the subchannel processor 74 be approximately 70 MHz. For the exemplary chirp signal having a bandwidth of 4 MHz, a bandwidth of 1 MHz in the bandpass filter 78 may be used.

It will be appreciated by those skilled in the art that the number of subchannel processors 74 is not limited to four, as used in the exemplary system. More or fewer subchannel processors 74 may be used with proper adjustments in other portions of the circuit such as adjustments for the amounts by which the reference chirp is offset and the bandwidth of the bandpass filters 78 with respect to the bandwidth of the chirp signal being used in the system.

Figure 9:
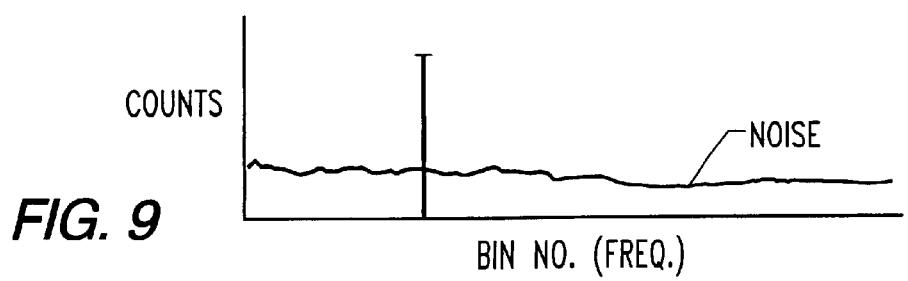
FIG. 9 is a pictorial diagram of the output of an FFT which may be used in the channel processor of FIG. 7.

With reference to FIG. 9, the operation of the FFT may be readily understood. As is well known, the output of an FFT may be considered a sequence of "bins". Each bin represents a frequency range and together all of the bins represent the bandwidth of the FFT. The FFT deposits into each bin a count (derived from $I^2 * Q^2$) indicative of the relative amplitude of the frequencies contained in the signal applied to the FFT. Since, in general, signals can have multiple frequencies present, more than one bin of an FFT may have significant counts present, each significant count representing the fact that the input signal has the frequency component related to the specific bin. In one embodiment of a system of the present invention, the output bins of the FFT in a subchannel processor having an acceptable CW signal may have counts as illustrated in FIG. 9. Note that most of the bins have some counts presence, illustrating the presence of broadband noise. More significantly, one or adjacent bins will have counts significantly higher than the noise bins, indicating the presence of a CW signal having the frequency associated with that bin(s).

In the exemplary embodiment of the present system, only CW signals having a bandwidth less than 1 MHz will pass the bandpass filter. Accordingly, the bandwidth of the FFT does not need to be greater than 1 MHz. If the FFT has 10,000 bins, each bin has an associated frequency width of 100 Hz (i.e., 1,0000,00/10,000). Because each subchannel processor in the exemplary system deals with 2.5 msec of time (a 10 msec length of chirp divided into four subchannels), each bin of the FFT represents 250 nanoseconds of time offset between the reference chirp and the received chirp signals which yields an approximate 250 foot range of resolution for the system when the time of arrival of the received signal is used to compute a location of the transmitter of the signal.

While the foregoing system has been described as identifying a single received chirp signal within a 2.5 millisecond period (the period of time represented by one subchannel processor), the present invention is not so limited. The signal detect circuit could select not just the strongest signal within the output of the FFT but all signals having a count in excess of a desired value or criterion. By using such a signal select circuit, the present invention can accurately detect and decode the signals from plural, asynchronous transmitters all of which have initiated their transmissions in such a fashion that the signals arrived at the receiving station within 2.5 milliseconds of each other.

Likewise, for ease of explanation of the subchannel processor logic, the foregoing description of a preferred embodiment has described four, parallel subchannel processors; however, if components of sufficient speed and additional memory is provided, some of the devices could be shared by the different subprocessors. For example, in a particular embodiment of the present invention, a single FFT could be used and switched between the subchannel processors. Other similar changes to share circuitry will be perceived by those skilled in the art without departing from the present invention.

Figure 10:
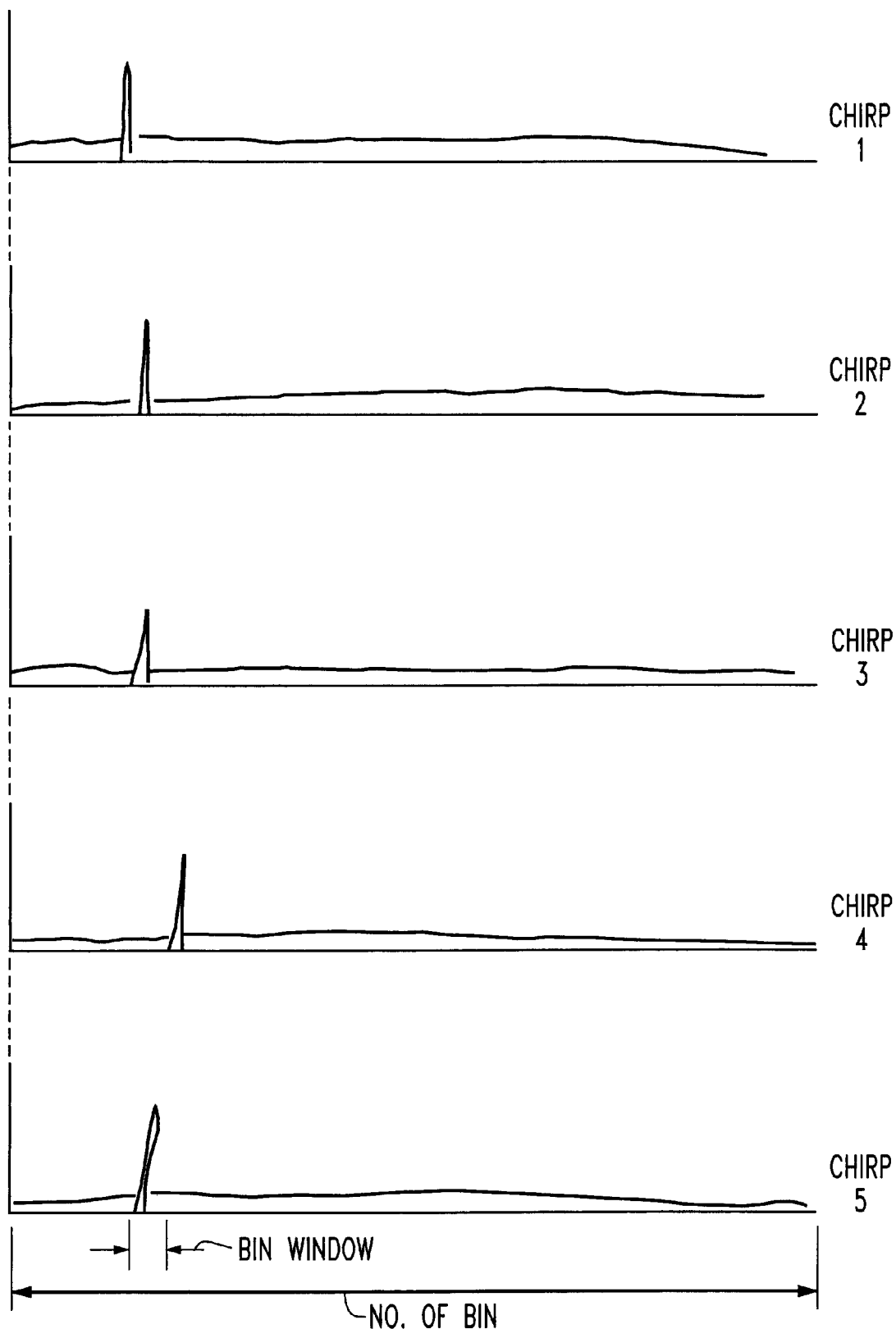
FIG. 10 is a pictorial diagram of the alignment of the output of the FFT of FIG. 9 for consecutive chirp signals.

With reference again to FIG. 7, the signal detect circuit 86 detects and identifies a received chirp signal or signals once each chirp cycle and passes this information along with its or their time of arrival to the data processor 56. The data processor 56 stores and processes the chirp data over plural chirp cycles, the number of cycles being dependent upon the protocol and framing of the system being implemented. For example, in the exemplary system described herein, the data processor 56 processes the last five chirps (i.e., the length of a chirp group of frame). As illustrated in FIG. 10, the data processor 56 data demodulates the chirp signals by comparing the results for the last five (in the exemplary system)

chirps for each subchannel processor. By sliding a 128 bin "window" across and down the output from one subchannel, the data processor 56 detects the presence of a frame of chirps (from the same transmitter). The width of the window may be determined from the encoding scheme used by the transmitter and the time represented by each bin of the FFT. For example, in the exemplary system, the encoding was done by delaying the initiation of the second through fifth chirps by up to 32 microseconds from the period of the first chirp. In the exemplary FFT in which each bin represents 250 nanoseconds of time, a delay of 32 microseconds equates to 128 bins (32 microsec/250 nanoseconds per bin=128 bins). If the data processor 54 detects five signal "hits" within the window, a frame of data has been detected. The time of arrival of the chirp frame may be taken from the time of arrival of Chirp 1 of the sequence of five chirps. The difference in bin numbers between Chirp 1 and Chirp 2 (divided by 4, as only every fourth bin is used for data in the exemplary system) provides the decimal number (between 0 and 31) representing the binary encoding of five bits. Similarly, the differences between the bins of Chirp 1 and of Chirps 3, 4, and 5 provide an additional fifteen bits of data.

By examining the outputs from all of the FFTs in the subchannel processors 74, the data processor 56 is able to assemble all of the frames of data (and the times of arrival) sent asynchronously by the plural transmitters within its range of reception. Thereafter, using conventional data decoding techniques, the data processor 56 may respond to the data as appropriate for particular applications by relaying messages to other systems, generating messages to be sent to other systems, and, generally, taking actions appropriate to the data/message.

As noted earlier, in one embodiment of the present invention, the data processor may receive signal data from plural channels (four in the exemplary system), each channel associated with a separate one of the antenna elements. In normal circumstances, signals reaching the antenna will be received at each of the elements, albeit at different times and with different arrival angles. In decoding the data, the data processor 56 may combine the results from the four channels by coherently adding them together, by voting the results of the four channels, or by any conventional results-accumulating scheme. If coherent totalling is used, false subchannel results stemming from noise will all non-coherently and will be lost.

The use of plural channels also enables the data processor 56 to compute an angle of arrival of a signal detected on plural elements in a conventional fashion.

In one aspect of the present invention, the signal data, time of arrival data and the angle of arrival data from plural receiving stations may be combined to identify and geolocate the transmitter(s) sending the received signals. As is known the time-difference-of-arrival of the same signal at three diverse receiving stations may be used to geolocate the transmitter of the signal. Similarly, the angle-of-arrival of the same signal at two diverse receiving stations may be used to geolocate the transmitter of the signal. Either or both the time-difference-of-arrival or the angle-of-arrival or a combination of both techniques may be used to geolocate a specific transmitter of the present invention.

Modifications to the disclosed system may be made within the spirit of the invention to provide data signals and/or geolocation information. For example, a system which used three receiving stations, each having only one channel, could be used to receive data messages and to geolocate the transmitter(s) of those-messages based on the time-difference-of-arrival of the signals at the three receiving stations. In such a system, there would be no requirement to compute the angle of arrival of the signals. Similarly, the present system can be used to communicate data (or events) and not to geolocate the transmitter at a savings of the elimination of the multiple antenna elements at each station.

Still other waveforms may be used to transmit the data signals and to be matched at the receiving stations. For example, the transmitters could use a pulse position encoding technique, such as described above, to encode the identification and/or data which is to be transmitted and then could modulate the data signal using a conventional direct sequence spread spectrum technique (such as a PN modulation technique). Upon receipt, the data signal could be decoded using, first, a conventional correlator decoder followed by a data demodulator which decodes the pulse position information. Similarly, the data signal can be generated and transmitted as described above with reference to FIGS. 2–4 and the receiving station can use a chirp signal correlator to determine the presence and time of arrival of a valid data signal. In such a correlator, the input signal may be correlated against a reference chirp signal (another form of a time invariant matched filter from that disclosed earlier). In such a system, when the outputs from the matching process of the correlator are aligned, an impulse is obtained, indicating the presence of at least one signal which had been transmitted in accordance with the teachings of one aspect of the present invention.

The applications in which the features and advantages of the system of the present invention can be successfully utilized are many. Such applications include, without limitation: a fleet management system in which vehicles carry transmitters (or "tags") which periodically transmit an identify signal so that a central control system can monitor the location of the fleet to ensure adequate coverage (e.g., for taxicabs or police patrols), to assist in efficient dispatch, or to inhibit the use of vehicles on unauthorized trips; a personnel location system for parolees in which the parolee carries the tag on his person to ensure he remains in authorized locations; surreptitious tracking of suspect vehicles using hidden tags attached thereto.

In contrast to the prior art, the present invention provides a system for communicating data and for geolocating plural objects in a relatively inexpensive system. The transmitters of the present invention are not synchronized either to each other, to the receivers or to any other infrastructure. Further, the transmitters do not need to have the ability to receive signals (as in, for example, polling systems) in order to permit multiple transmitters to be able to transmit nearly simultaneously with a substantially reduced likelihood of disastrous signal. The receiving stations in the present invention do not need apriori knowledge of the identity of the transmitter before decoding a message which has arrived at an unknown time.

In further contrast with the prior art, the present invention permits asynchronous, simultaneous transmissions by plural transmitters but does not require a complex and costly set of correlators in each receiving station in order to sort out the plural signals from one another. By using a time invariant matched filter, the present invention avoids the need in prior art systems for polling and/or for complicated receiving stations which are capable of looking within small signalling periods for one of a large set of possible signal positions.

As will be readily seen by one skilled in the art, the relatively low cost of the transmitters of the present invention, coupled with the absence of any need for forward transmissions to mobile units and the relatively high capacity of the system in terms of the number of tags (or remote transmitters) which may be simultaneously operating therein, and the ability to transmit both identifying information and other data from the tags provide a flexible system and method of efficient communications.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. In a system for locating a mobile transmitter, a transmitter comprising:
   (a) means for creating a unique identification for said transmitter, wherein said means for creating is located at said transmitter;
   (b) means for transmitting a modulated signal from said transmitter, wherein said modulated signal has encoded therein the unique identification, and wherein the unique identification comprises a unique set of time differences between successive pulses of a signal.

2. The transmitter of claim 1, wherein said means for creating a unique identification includes ROM programming.

3. The transmitter of claim 1, wherein said means for transmitting a modulated signal includes an amplifier.

4. A system for communicating information from a mobile transmitter to a receiver in a fixed location comprising:
   a means for providing the information to be communicated to the transmitter;
   said transmitter including a chirp signal generator and a controller for receiving the information to be communicated and for controlling the chirp generator so that chirps are generated to thereby encode the information to be communicated;
   a source of a carrier signal;
   a modulator having as one of its inputs said carrier signal; and
   a timing control circuit for applying chirp signals to said modulator in a timed relationship between chirp signals to thereby encode the information as a modulation of said carrier signal.

5. The system of claim 4, wherein said means for providing the information includes a switch.

6. The system of claim 4, wherein said means for providing the information includes a button positioned for activation by a user of the transmitter.

7. The system of claim 4, wherein said controller includes an analog to digital converter.

8. The system of claim 4 further comprising a means for transmitting the encoded information to a receiver.

9. The system of claim 8, wherein said means for transmitting includes an amplifier.

10. The system of claim 8, wherein said means for transmitting includes an antenna.

11. A method of communicating from a mobile transmitter to a receiver in a fixed location comprising the steps of:
    (a) providing the information to be communicated to the transmitter;
    (b) controlling a chirp generator in the transmitter so that chirps are generated to encode the information to be communicated;
    (c) modulating a carrier signal by applying the generated chirp signals to the carrier signal in a timed relationship between chirp signals to thereby encode the information as a modulation of said carrier signal; and
    (d) transmitting the modulated signal from the transmitter to the receiver.

* * * * *